(12) United States Patent
Iwamoto et al.

(10) Patent No.: US 11,079,290 B2
(45) Date of Patent: Aug. 3, 2021

(54) CONTACT FORCE MEASUREMENT METHOD

(71) Applicant: MITSUBISHI HEAVY INDUSTRIES, LTD., Tokyo (JP)

(72) Inventors: Yoichi Iwamoto, Tokyo (JP); Masaaki Katayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 314 days.

(21) Appl. No.: 16/308,981

(22) PCT Filed: Jul. 10, 2017

(86) PCT No.: PCT/JP2017/025111
§ 371 (c)(1),
(2) Date: Dec. 11, 2018

(87) PCT Pub. No.: WO2018/092352
PCT Pub. Date: May 24, 2018

(65) Prior Publication Data
US 2019/0195707 A1    Jun. 27, 2019

(30) Foreign Application Priority Data
Nov. 21, 2016 (JP) .............................. JP2016-225635

(51) Int. Cl.
*G01L 1/00* (2006.01)
*G01L 1/25* (2006.01)
(Continued)

(52) U.S. Cl.
CPC ............ *G01L 1/255* (2013.01); *F22B 37/003* (2013.01); *G01B 17/02* (2013.01); *G01L 1/00* (2013.01);
(Continued)

(58) Field of Classification Search
CPC ....... G01L 1/165; G01L 5/0047; G01L 25/00; G01N 27/87; G01N 27/90; G01N 27/9006; G01N 27/9013; G01N 27/902
See application file for complete search history.

(56) References Cited

U.S. PATENT DOCUMENTS 4,528,856 A * 7/1985 Junker .................... G01B 7/24
324/209
4,893,671 A * 1/1990 Lagally ................ F22B 37/206
122/510
(Continued)

FOREIGN PATENT DOCUMENTS

EP    0196020 A2 * 10/1986  ........... G01N 27/902
EP    0 243 082 A2   10/1987
(Continued)

OTHER PUBLICATIONS

English Translation of FR-2487969-A1 (Year: 1982).*
(Continued)

*Primary Examiner* — Alexander A Mercado
(74) *Attorney, Agent, or Firm* — Westerman, Hattori, Daniels & Adrian, LLP

(57) ABSTRACT

There is provided a method for measuring a contact force applied to each tube constituting a tube bundle disposed in a fluid from a vibration damping member by using a probe inserted into each tube. Characteristic data defining a relationship between a value measured by the probe and the contact force is previously prepared. Then, the probe is inserted into the tube, and the contact force is calculated using the measurement value of the probe, based on the characteristic data.

9 Claims, 9 Drawing Sheets

(51) Int. Cl.
| | |
|---|---|
| F22B 37/00 | (2006.01) |
| G01N 27/72 | (2006.01) |
| G01L 5/00 | (2006.01) |
| G21C 17/003 | (2006.01) |
| G21D 1/00 | (2006.01) |
| G01N 27/90 | (2021.01) |
| G01B 17/02 | (2006.01) |
| G01N 29/11 | (2006.01) |

(52) U.S. Cl.
CPC ............ *G01L 1/005* (2013.01); *G01L 5/0033* (2013.01); *G01N 27/72* (2013.01); *G01N 27/90* (2013.01); *G01N 29/11* (2013.01); *G21C 17/003* (2013.01); *G21D 1/00* (2013.01); *Y02E 30/30* (2013.01)

(56) References Cited

U.S. PATENT DOCUMENTS

| | | | | |
|---|---|---|---|---|
| 5,134,367 | A * | 7/1992 | Griffith | G01N 27/9006 324/220 |
| 5,309,377 | A * | 5/1994 | Beebe | G01M 17/022 702/105 |
| 2005/0154564 | A1* | 7/2005 | Le | G01N 27/902 702/189 |
| 2012/0002775 | A1* | 1/2012 | Debroise | G01N 27/87 376/249 |
| 2018/0106762 | A1* | 4/2018 | Boenisch | G01N 27/902 |
| 2020/0232947 | A1* | 7/2020 | O'Dell | G01N 27/9033 |

FOREIGN PATENT DOCUMENTS

| | | | | |
|---|---|---|---|---|
| FR | 2487969 | A1 * | 2/1982 | ........... G01N 27/902 |
| FR | 2 745 115 | A1 | 8/1997 | |
| GB | 2529484 | A | 2/2016 | |
| JP | S60-169757 | A | 9/1985 | |
| JP | S62-93586 | U | 6/1987 | |
| JP | H09-257453 | A | 10/1997 | |
| JP | H11-264775 | A | 9/1999 | |
| JP | 2010-197096 | A | 9/2010 | |
| JP | 2010-230337 | A | 10/2010 | |
| JP | 2014-041102 | A | 3/2014 | |
| JP | 2014-048183 | A | 3/2014 | |
| KR | 10-2005-0001859 | A | 1/2005 | |
| WO | 2014/030718 | A1 | 2/2014 | |
| WO | WO-2016071624 | A1 * | 5/2016 | ............ G21D 1/006 |

OTHER PUBLICATIONS

English Translation of EP-0196020-A2 (Year: 1986).*
English Translation of WO-2016071624-A1 (Year: 2016).*
International Search Report dated Oct. 3, 2017, issued in counterpart application No. PCT/JP2017/025111, with English translation. (13 pages).
Notification of Transmittal of Translation of the International Preliminary Report on Patentability (Form PCT/IB/338) issued in counterpart International Application No. PCT/JP2017/025111 dated May 31, 2019 with Forms PCT/IB/373, PCT/IB/326 and PCT/ISA/237, with English translation. (19 pages).
Office Action dated Mar. 17, 2020, issued in counterpart JP Application No. 2016-225635, with English translation (8 pages).
Extended (Supplementary) European Search Report dated Apr. 16, 2019, issued in counterpart EP application No. 17872754.1 (9 pages).

* cited by examiner

CONTACT FORCE MEASUREMENT METHOD

TECHNICAL FIELD

This disclosure relates to a method for measuring a contact force applied to each tube from a vibration damping member inserted into a clearance between tubes in a tube bundle disposed in a fluid.

BACKGROUND ART

Some tube bundles used in heat exchangers such as steam generators adopt a vibration damping structure in which an anti-vibration bar is inserted as a vibration damping member into a clearance between tubes for suppressing vibration caused when the tube bundle is disposed in a fluid. For instance, Patent Document 1 discloses an example of the vibration damping structure for a heat-transfer tube bundle in which a substantially V-shaped vibration damping member is inserted into a clearance between heat-transfer tubes included in a heat exchanger.

CITATION LIST

Patent Literature

Patent Document 1: JPS62-93586U (Utility Model)

SUMMARY

Problems to be Solved

It has been recently indicated that self-excited vibration phenomena, such as fluid elastic vibration, along an in-plane direction (an axial direction of individual tubes) can occur in a tube bundle having a U-bent portion including U-shaped tubes. A vibration damping member used in a conventional vibration damping structure including Patent Document 1 is assumed to be used for suppressing vibration which occurs in an out-of-plane direction (a direction substantially perpendicular to the axial direction of individual tubes), and thus the thickness thereof is designed to be equal to or slightly smaller than a clearance between tubes. Hence, a contact force applied to each tube by the vibration damping member is substantially zero, and measures are desired to suppress a vibration phenomenon in the in-plane direction.

To suppress the vibration phenomenon along the in-plane direction, it is necessary to design a novel vibration damping structure which provides an appropriate contact force to each tube by the vibration damping member. In this case, it is necessary to measure a contact force to appropriately evaluate the contact force applied to each tube by the vibration damping member.

At least one embodiment of the present invention was made in view of the above circumstances, and an object thereof is to provide a contact force measurement method whereby it is possible to appropriately measure a contact force applied to each tube by a vibration damping member supporting a tube bundle disposed in a fluid.

Solution to the Problems (1) To solve the above problems, according to at least one embodiment of the present invention, a contact force measurement method for measuring, in a vibration damping structure in which a tube bundle disposed in a fluid is supported by a vibration damping member inserted between tubes included in the tube bundle, a contact force applied to the tube bundle from the vibration damping member by a probe inserted into each tube comprises: a characteristic data preparation step of previously preparing characteristic data defining a relationship between a value measured by the probe and the contact force; a measurement value acquisition step of inserting the probe into the tube and acquiring a measurement value measured by the probe; and a contact force calculation step of calculating the contact force corresponding to the measurement value, based on the characteristic data.

With the above method (1), a relationship between a value measured by the probe insertable into the tube and a contact force is previously prepared as the characteristic data, so that a contact force corresponding to an actual measurement value obtained by the probe can be appropriately calculated based on the characteristic data.

(2) In some embodiments, in the above method (1), the characteristic data preparation step includes performing a load test while applying a predetermined load simulating the contact force to a sample corresponding to the tube supported by the vibration damping member and acquiring a measurement value measured by the probe inserted into the sample to generate the characteristic data.

With the above method (2), since the characteristic data is generated by a load test using a sample corresponding to a subject to be measured, reliable characteristic data can be achieved.

(3) In some embodiments, in the above method (1) or (2), the measurement value acquisition step includes acquiring positional information of the probe in conjunction with the measurement value while scanning the probe within the tube, and associating and storing the measurement value and the positional information.

With the above method (3), since the measurement value and the positional information are associated and stored when measurement is performed while the probe is scanned, it is possible to efficiently measure the contact force over a wide range continuously.

(4) In some embodiments, in the above method (3), the characteristic data preparation step includes generating first characteristic data based on the measurement value acquired by applying the predetermined load on opposite sides so as to sandwich the tube from both sides at a substantially same position along an axial direction of the sample, and generating second characteristic data based on the measurement value acquired by applying the predetermined load on opposite sides so as to sandwich the tube at different positions along the axial direction of the sample, and the contact force calculation step includes using the first characteristic data or the second characteristic data as the characteristic data, based on a positional relationship between the tube and the vibration damping member.

In the above method (4), the characteristic data are separately prepared in accordance with arrangement mode of the vibration damping members with respect to each tube (for the case where the tube is supported from both sides or the case where the tube is supported from one side). Then, the contact force is calculated using corresponding characteristic data in accordance with the positional relationship between the tube and the vibration damping members at a measurement point to be measured. Thus, although the measurement value of the probe can have errors due to, for instance, the arrangement mode of the vibration damping members, it is possible to reduce the influence of the errors and precisely calculate the contact force.

(5) In some embodiments, in the above method (4), the tube includes a first point at which the vibration damping member is disposed on opposite sides so as to sandwich the tube from both sides at a substantially same position along the axial direction, and a second point at which the vibration damping member is disposed on one side at a substantially same position along the axial direction, and the contact calculation step includes calculating the contact force corresponding to the measurement value measured at the first point, based on the first characteristic data, and calculating the contact force corresponding to the measurement value measured at the second point, based on the second characteristic data.

In the above method (5), the contact force is calculated by using the first characteristic data and the second characteristic data depending on situations where a point to be measured is the first point or the second point. Thus, although the measurement value of the probe can have errors due to, for instance, the arrangement mode of the vibration damping members, it is possible to reduce the influence of the errors and precisely calculate the contact force.

(6) In some embodiments, in the above method (3), the measurement value acquisition step includes providing a marker detectable by the probe at a reference position along an axial direction of the tube, and acquiring the positional information based on displacement from the reference position when the measurement value is acquired.

With the above method (6), when measurement is performed while scanning the probe within the tube, it is possible to precisely control the positional information using the marker disposed at the reference position as reference.

(7) In some embodiments, in any one of the above methods (1) to (6), the probe includes an eddy current testing probe insertable into the tube.

With the above method (7), it is possible to precisely measure the influence of the contact force including slight deformation by using the eddy current testing probe as the probe.

(8) In some embodiments, in any one of the above methods (1) to (6), the tube includes a displacement meter capable of measuring an inner diameter of the tube by being inserted into the tube.

With the above method (8), it is possible to measure the contact force based on displacement caused by deformation of the tube due to the contact force, by using the displacement meter as the probe.

Advantageous Effects

At least one embodiment of the present invention provides a contact force measurement method whereby it is possible to appropriately measure a contact force applied to each tube by a vibration damping member supporting a tube bundle disposed in a fluid.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

[1. Measurement Subject]

Figure 1:
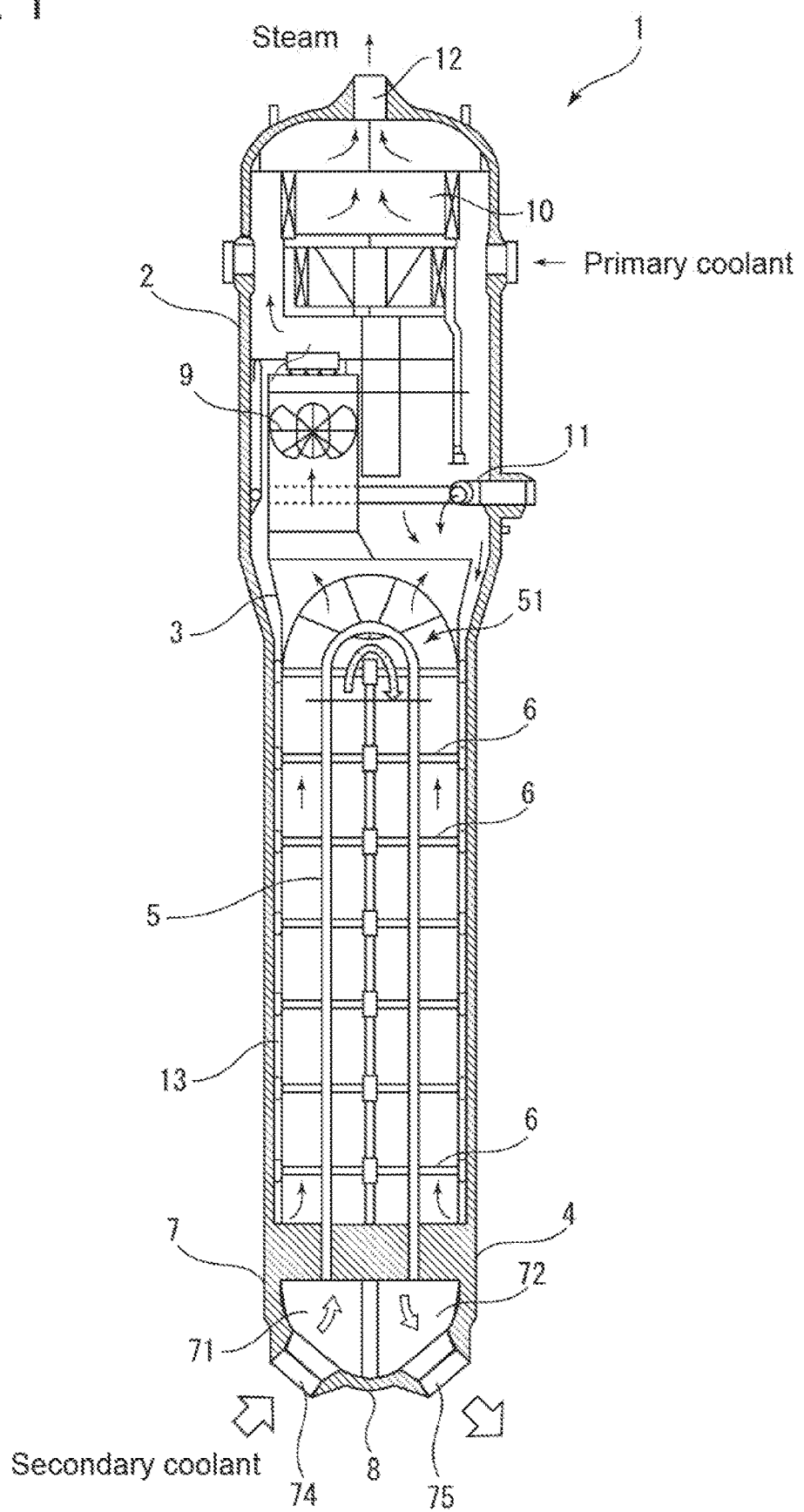
FIG. 1 is a schematic side cross-sectional view of a steam generator to be measured by a contact force measurement method according to at least one embodiment of the present invention.
Figure 2:
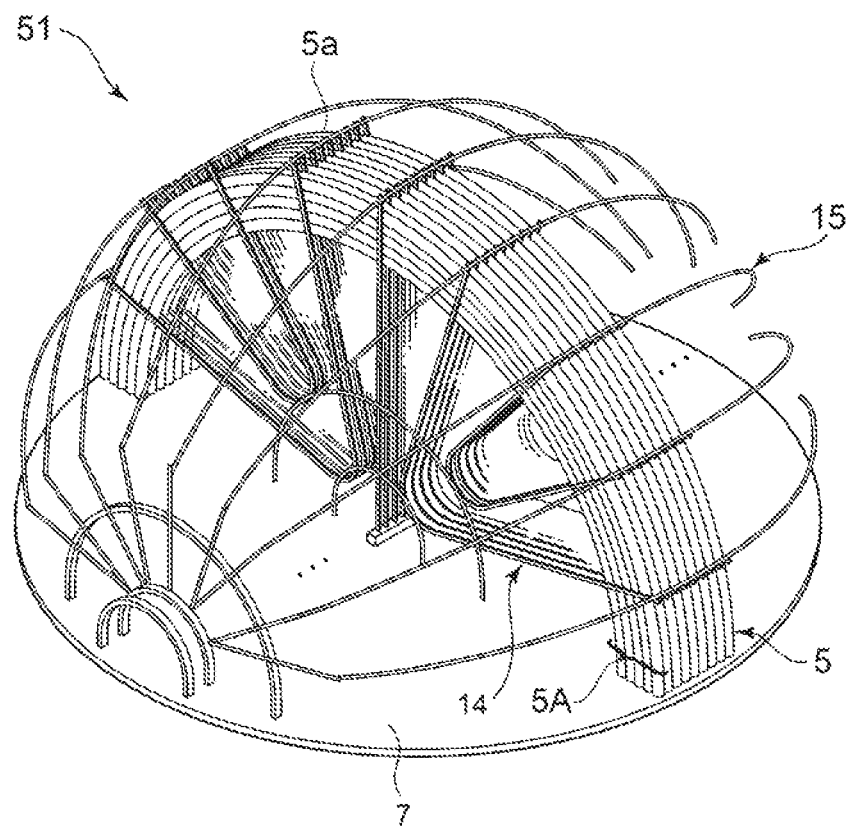
FIG. 2 is a schematic perspective view of a heat-transfer tube bundle in FIG. 1.

First, a subject to be measured by the contact force measurement method according to an at least one embodiment of the present invention will be described. FIG. 1 is a schematic side cross-sectional view of a steam generator 1 to be measured by the contact force measurement method according to at least one embodiment of the present invention. FIG. 2 is a schematic perspective view of a heat-transfer tube bundle 51 in FIG. 1.

The steam generator 1 is a heat exchanger having a heat-transfer tube bundle including a plurality of heat-transfer tubes, for instance, a steam generator used in a pressurized water reactor (PWR). Through the steam generator 1 flow a primary coolant (e.g., soft water), serving as a reactor coolant and a neutron moderator circulating within a reactor, and a secondary coolant circulating within a turbine. In the steam generator 1, the primary coolant with increased temperature and pressure transfers heat to the secondary coolant, so that the secondary coolant is evaporated into steam, and the primary coolant with increased temperature and pressure is cooled.

The steam generator 1 has a sealed hollow cylindrical shape and is disposed along a vertical direction. The steam generator 1 has a body section 2 including an upper half portion and a lower half portion having a slightly smaller diameter than the upper half portion. Within the lower half portion, a tube bundle external cylinder 3 of cylindrical shape is disposed at a predetermined distance from an inner wall surface of the body section 2. The tube bundle external cylinder 3 has a lower end which extends to near a tube sheet 4 disposed at a lower part of the lower half portion of the body section 2. Within the tube bundle external cylinder 3, a heat-transfer tube bundle 51 is disposed. The heat-transfer tube bundle 51 includes a plurality of heat-transfer tubes 5 each having a reversed U-shape. Each heat-transfer tube 5 is arranged so that a U-shaped arc portion is convex upward. Both lower end portions of the heat-transfer tube 5 are supported by the tube sheet 4, and a middle portion is supported by the tube bundle external cylinder 3 via a plurality of tube support plates 6. The tube support plate 6 has multiple through holes (not shown) formed therein. The heat-transfer tubes 5 are inserted into the through holes.

A lower end of the body section 2 is provided with a water chamber 7. The interior of the water chamber 7 is divided into an inlet chamber 71 and an outlet chamber 72 by a partition 8. The inlet chamber 71 communicates with one end of each heat-transfer tube 5, and the outlet chamber 72 communicates with the other end of each heat-transfer tube 5. The inlet chamber 71 is provided with an inlet nozzle 74 communicating with the outside of the body section 2, and the outlet chamber 72 is provided with an outlet nozzle 75 communicating with the outside of the body section 2. The inlet nozzle 74 is connected to a cooling water pipe (not shown) through which the primary coolant is transferred from the pressurized water reactor, and the outlet nozzle 75 is connected to a coolant water pipe (not shown) thorough which the primary coolant after heat exchange is transferred to the pressurized water reactor.

The upper half portion of the body section 2 is provided with a gas-water separator 9 for separating the secondary coolant after heat exchange into steam (gas phase) and hot water (liquid phase), and a moisture separator 10 for removing moisture of the separated steam into a state close to dry steam. A water supply pipe 11 for supplying the secondary coolant into the body section 2 from the outside is inserted between the gas-water separator 9 and the heat-transfer tube bundle 51. An upper end of the body section 2 is provided with a steam outlet 12. Further, a water supply channel 13 is formed in the lower half portion of the body section 2, thorough which the secondary coolant supplied into the body section 2 from the water supply pipe 11 flows downward between the body section 2 and the tube bundle external cylinder 3, turns at the tube sheet 4, and then flows upward along the heat-transfer tube bundle 51.

The steam outlet 12 is connected to a cooling water pipe (not shown) for transferring steam to the turbine. The water supply pipe 11 is connected to a cooling water pipe (not shown) for supplying the secondary coolant obtained by cooing steam used in the turbine by a condenser (not shown).

In such a steam generator 1, the primary coolant heated in the pressurized water reactor is transferred to the inlet chamber 71, passes and circulates through the multiple heat-transfer tubes 5, and reaches the outlet chamber 72. On the other hand, the secondary coolant cooled by the condenser is transferred to the water supply pipe 11, passes through the water supply channel 13 within the body section 2, and flows upward along the heat-transfer tube bundle 51. At this time, heat exchange occurs between the primary coolant having high pressure and high temperature and the secondary coolant within the body section 2. Then, the cooled primary coolant returns to the pressurized water reactor through the outlet chamber 72. On the other hand, the secondary coolant after heat exchange with the primary coolant having high pressure and high temperature flows upward within the body section 2 and is separated into steam and hot water by the gas-water separator 9. The moisture of the separated steam is removed by the moisture separator 10, and the steam is then transferred to the turbine.

As shown in FIG. 2, an upper end portion of the heat-transfer tube bundle 51 has a semi-spherical shape in which arc portions 5a of the heat-transfer tubes 5 of reversed U-shape are arranged. The heat-transfer tubes 5 are arranged so that a heat-transfer tube 5 situated more outside in a radial direction of the curvature radius has a lager curvature radius and their axial directions are parallel, thus forming heat-transfer tube layers 5A. The heat-transfer tube layers 5A are arranged in parallel at a predetermined interval in an out-of-plane direction perpendicular to their planes. In these heat-transfer tube layers 5A, among the respective heat-transfer tubes 5 situated outermost in the radial direction of the curvature radius in their plane, one situated more outside in the out-of-plane direction has a smaller curvature radius. The heat-transfer tubes 5 thus arranged form the upper end portion of the heat-transfer tube bundle 51 of semi-spherical shape.

The steam generator 1 thus configured causes flow-induced vibration at the reversed U-shaped arc portions 5a when the primary coolant passes through the respective heat-transfer tubes 5. Hence, the arc portion 5a of the heat-transfer tube 5 is provided with a plurality of vibration damping members 14 to suppress vibration of the heat-transfer tube 5. The vibration damping members 14 are each inserted between the heat-transfer tube layers 5A arranged in parallel and are made of a metal material such as stainless steel. End portions of the vibration damping members 14 extend to the outside of the arc portions 5a and are held by arc-shaped retention members 15 attached along the outer circumference of the arc portions 5a of semi-spherical shape.

In this embodiment, in particular, the thickness of the vibration damping member 14 is designed to be slightly larger than a clearance between the heat-transfer tubes 5. This allows the vibration damping member 14 to be pressed by a reaction force due to elastic deformation of the heat-transfer tube 5, thus forming a vibration damping structure capable of effectively suppressing vibration in the in-plane direction. Also in this vibration damping structure, the heat-transfer tubes 5 and the vibration damping members 14 have dimensional variation due to manufacturing precision. Thus, if the thickness of the vibration damping member 14 is too large, the heat-transfer tube 5 can be subjected to plastic deformation. Accordingly, the contact force of the heat-transfer tube 5 needs to be appropriately controlled. To this end, it is necessary to measure the contact force of the heat-transfer tube 5. The thickness of the vibration damping member 14 may be designed to be equal to a clearance between the heat-transfer tubes 5. In this case, when the thickness of the vibration damping member 14 is made larger than an average clearance by thermal expansion of the respective members and pressure expansion of the heat-transfer tube 5 under operation (at high temperature), it is possible to achieve the same effect as described above.

[2. Contact Force Measurement System]

Figure 3:
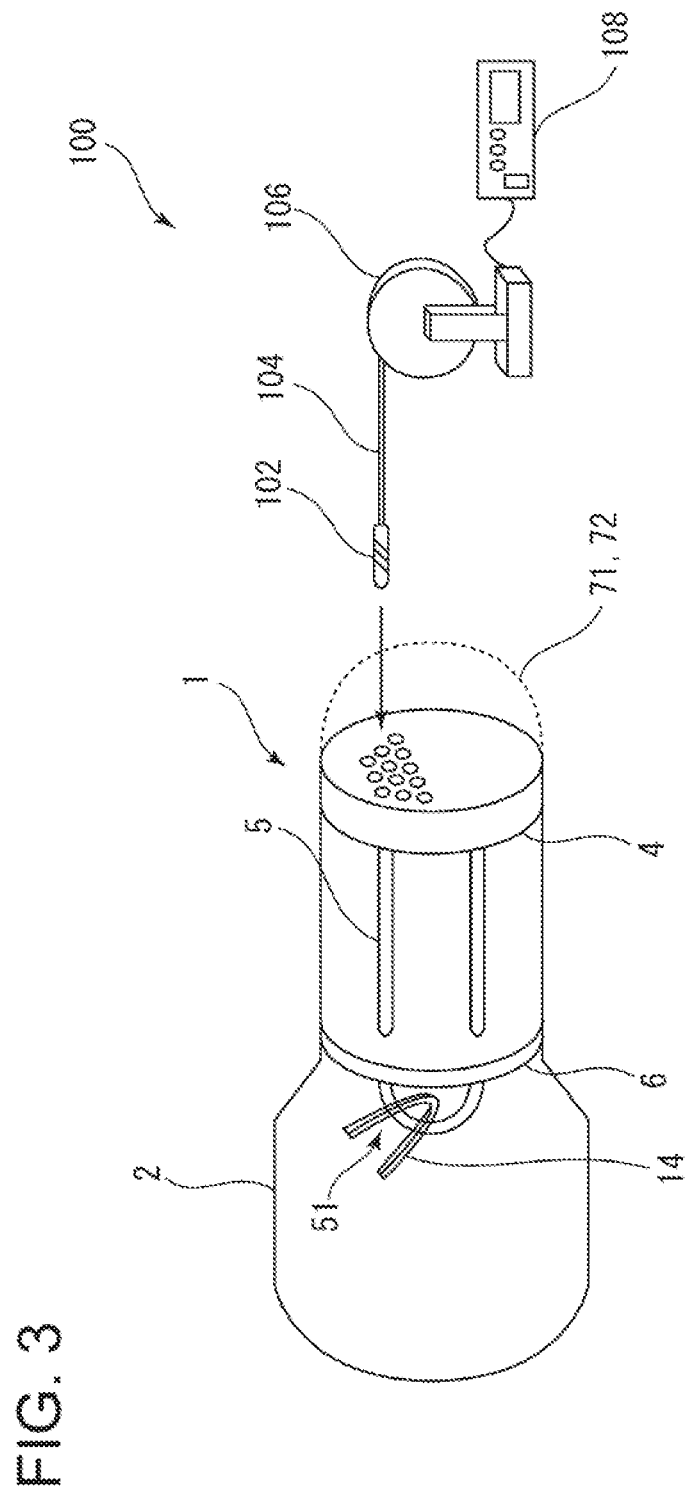
FIG. 3 is a schematic diagram showing an overall configuration of a contact force measurement system according to at least one embodiment of the present invention.
Figure 4:
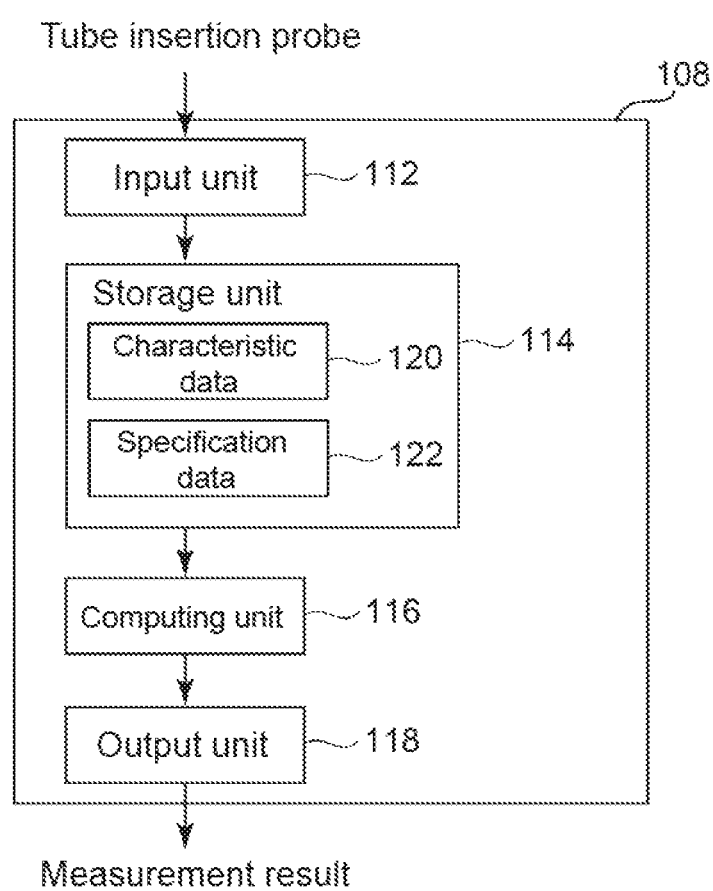
FIG. 4 is a block diagram functionally showing an internal configuration of a measurement tool body in FIG. 3.

Next, a contact force measurement system 100 used for performing the contact force measurement method on the steam generator 1 having the above configuration will be described. FIG. 3 is a schematic diagram showing an overall configuration of the contact force measurement system 100 according to at least one embodiment of the present invention. FIG. 4 is a block diagram functionally showing an internal configuration of a measurement tool body in FIG. 3.

FIG. 3 shows contact force measurement in which the steam generator 1 is installed so that an end portion of the heat-transfer tube 5 inserted into the tube sheet 4 is exposed, and a tube insertion probe 102 of the contact force measurement system 100 is inserted into the heat-transfer tube 5 in an empty state where a fluid is previously discharged from the heat-transfer tube 5. Further, in FIG. 3, a pair of the heat-transfer tube 5 and the vibration damping member 14 of the heat-transfer tube bundle 51 is representatively shown for the avoidance of complications.

The contact force measurement system 100 includes a tube insertion probe 102 which can be inserted into the heat-transfer tube 5. The tube insertion probe 102 is accommodated in a holder attached to the distal end of a carrying cable 104 formed of a flexible material composed of a Teflon (registered trademark) tube, a spring coil or the like. The carrying cable 104 is connected to a winding device 106 and is configured to be wound or unwound in response to operation of the winding device 106 to carry the tube insertion probe 102 disposed at the distal end of the carrying cable 104 into or out of the heat-transfer tube 5 along the axial direction.

In this embodiment, in particular, the tube insertion probe 102 is an eddy current testing (ECT) probe and outputs a measurement signal corresponding to the reduction in thickness, damage, crack, or the like of the heat-transfer tube 5. The measurement signal from the tube insertion probe 102 is stored in the carrying cable 104 or is transferred to a measurement tool body 108 disposed outside via a signal line (not shown) which runs parallel to the carrying cable 104.

The measurement tool body 108 is composed of an electronic computing device such as a computer, and calculates the contact force by performing analysis using the measurement signal acquired from the tube insertion probe 102. As shown in FIG. 4, the measurement tool body 108 includes an input unit 112 receiving input data from various input devices manipulated by an operator or the tube insertion probe 102, a storage unit 114 storing an algorithm relating to various operation and various data input from the input unit or the like, a computing unit 116 calculating the contact force by operation based on the algorithm and various data stored in the storage unit 114, and an output unit 118 outputting a calculating result in the computing unit 116.

In particular, the storage unit 114 previously stores characteristic data 120 which defines a relationship between a value measured by the tube insertion probe 102 and the contact force of the vibration damping member 14 to the heat-transfer tube 5, and specification data 122 which defines the layout specification of the heat-transfer tube 5 and the vibration damping member 14 in the heat-transfer tube bundle 51. The characteristic data 120 is generated by a load test using a sample 122, as described later.

[3. Contact Force Measurement Method]

Figure 5:
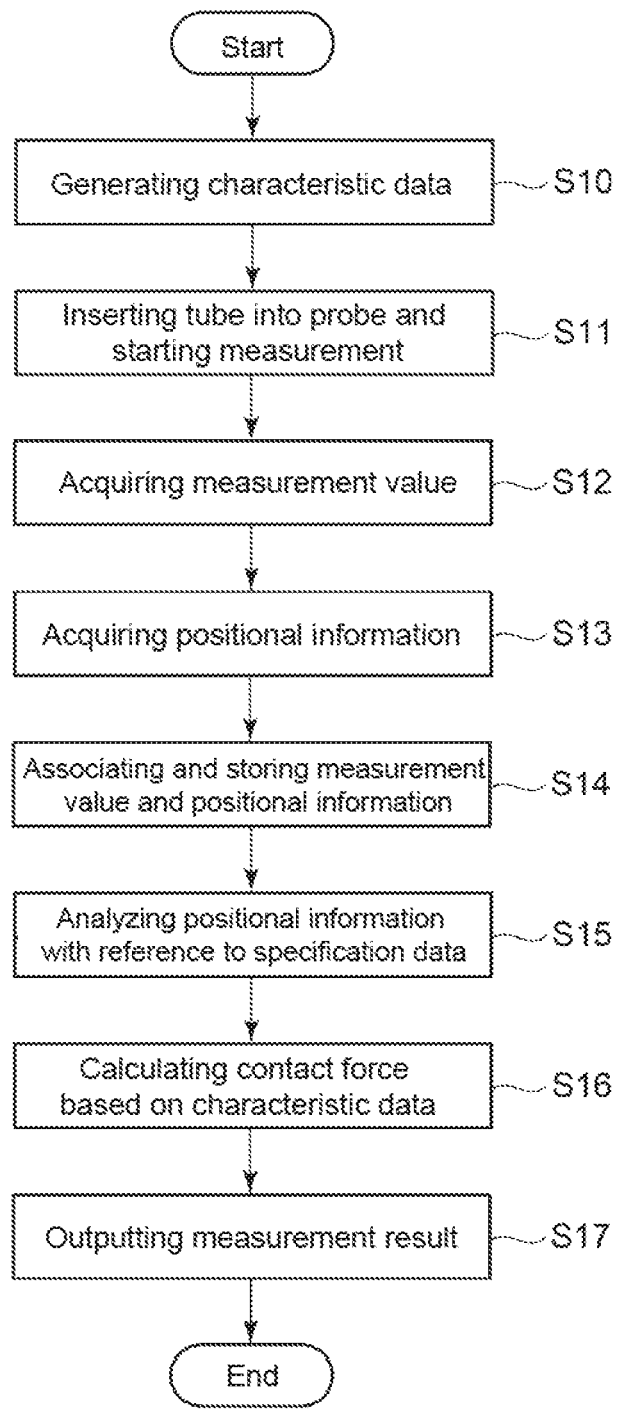
FIG. 5 is a flowchart showing each step of a contact force measurement method according to at least one embodiment of the present invention.
Figure 6:
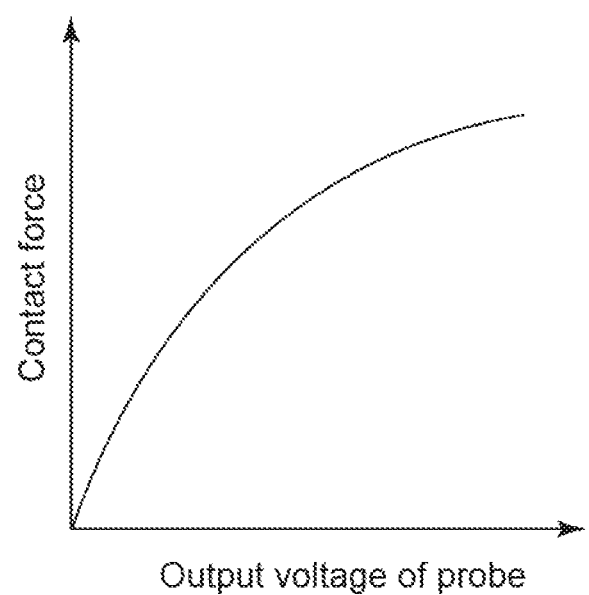
FIG. 6 is a graph showing an example of characteristic data generated in step S10 of FIG. 5.
Figure 7:
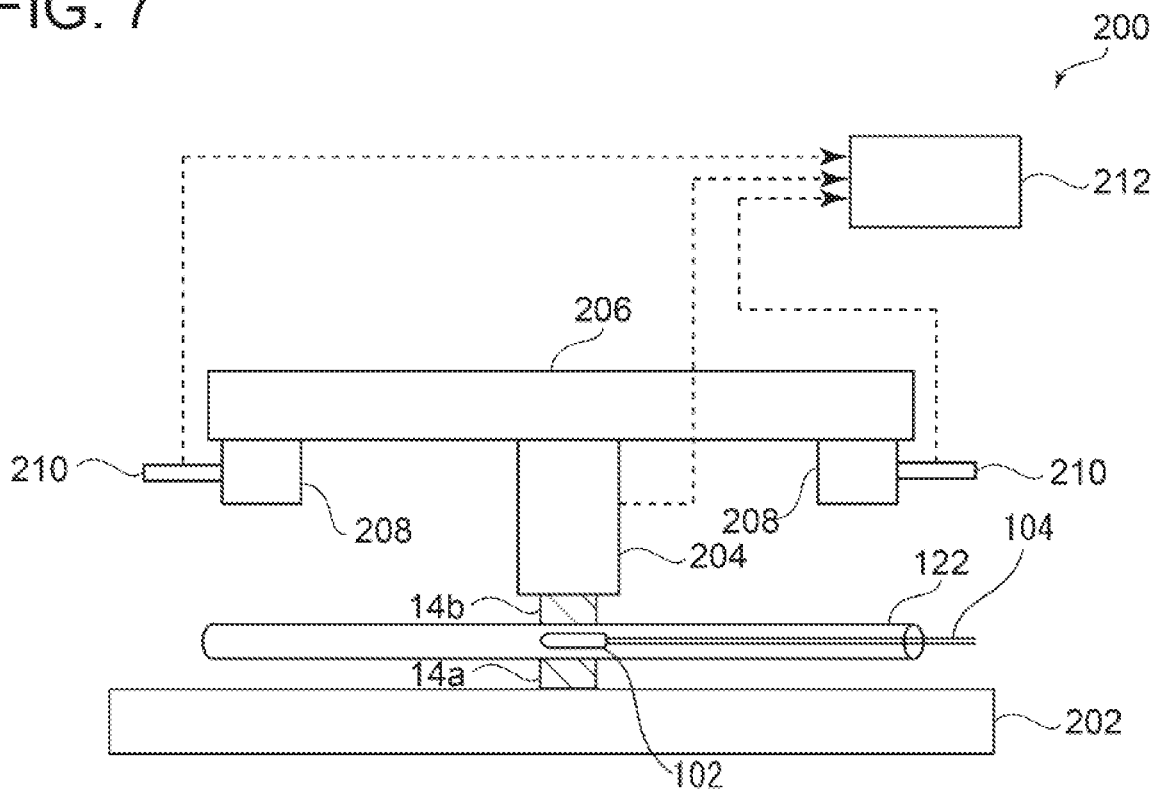
FIG. 7 is a schematic diagram showing an example of a load test performed in step S10 of FIG. 5.
Figure 8:
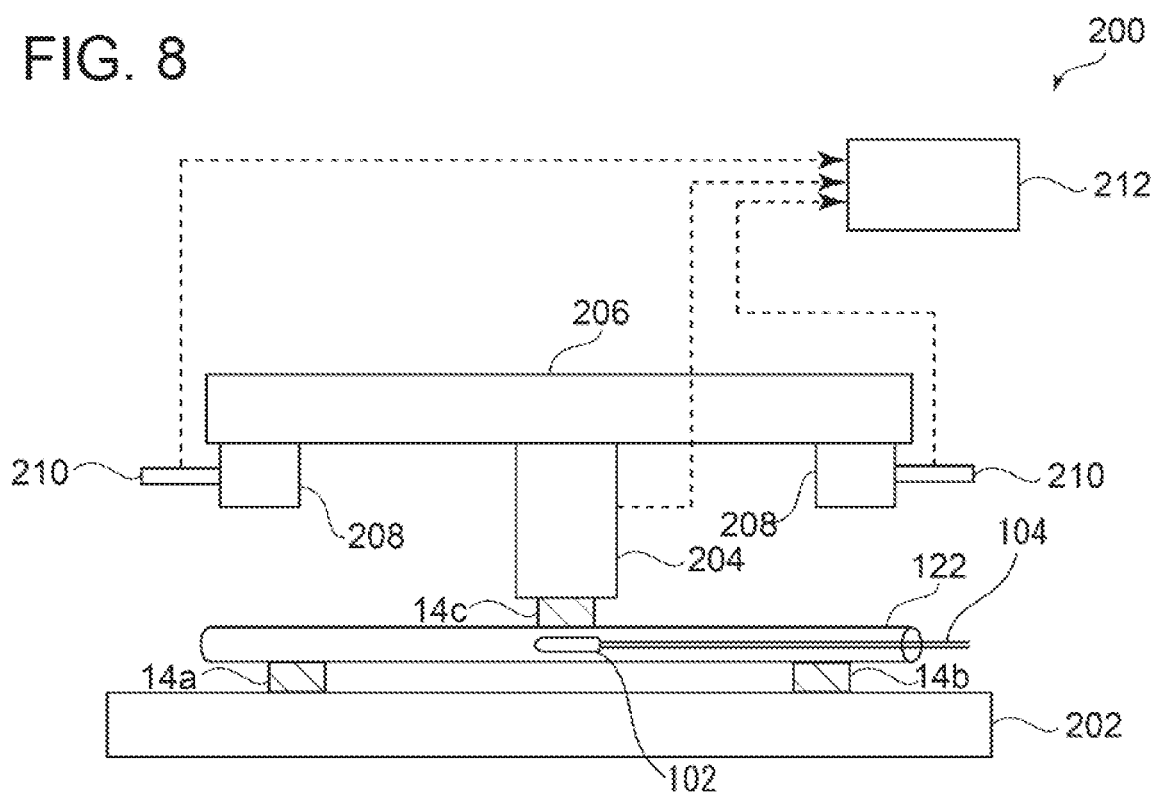
FIG. 8 is a schematic diagram showing another example of a load test performed in step S10 of FIG. 5.

Next, a contact force measurement method performed by the contact force measurement system 100 with the above configuration will be described. FIG. 5 is a flowchart showing each step of the contact force measurement method according to at least one embodiment of the present invention. FIG. 6 is a graph showing an example of characteristic data 120 generated in step S10 of FIG. 5. FIG. 7 is a schematic diagram showing an example of a load test performed in step S10 of FIG. 5. FIG. 8 is a schematic diagram showing another example of a load test performed in step S10 of FIG. 5.

First, for preparation, the characteristic data 120 required for performing the contact force measurement method is generated in advance (step S10). The characteristic data 120 is generated, for instance, as a characteristic graph as shown in FIG. 6 which defines a relationship between a measurement value of the tube insertion probe 102 and the contact force of the vibration damping member 14 to the heat-transfer tube 5. Such characteristic data 120 is generated by performing a load test using a sample 122 equivalent to the heat-transfer tube 5 to be measured prior to following steps.

With reference to FIGS. 7 and 8, the load test for generating the characteristic data 120 will be described in detail. The load test is performed by applying a predetermined load simulating the contact force to the sample 122 corresponding to the heat-transfer tube 5 supported by the vibration damping member 14 and acquiring a measurement value of the tube insertion probe 102 inserted into the sample 122.

Such a load test is performed with a load test device 200 shown in FIGS. 7 and 8. The load test device 200 is a so-called compression test machine including a test table 202 which is a base, a load cell 204 disposed so as to come into contact with the sample 122 situated on the test table 202 from above, a crosshead 206 configured to support the load cell 204 and apply a predetermined load to the load cell 204 from above, a magnet stand 208 disposed on each of both ends of the crosshead 206, a displacement meter 210 disposed on each magnet stand 208 and configured to detect displacement between the test table 202. In the load test device 200, the test table 202 is moved vertically relative to the crosshead 206 by a power source (not shown) so that a predetermined load is applied to the sample 122 disposed between the test table 202 and the load cell 204. The load applied to the sample 122 is detected by the load cell 204 and transferred to a static strain meter 212 together with a detection result of the displacement meter 210.

In the load test, while the tube insertion probe 102 is inserted into the sample 122, the static strain meter 212 acquires output voltage of the tube insertion probe 102 and load detected by the load cell 204 to generate the characteristic data 120 indicating a relationship between the output voltage and the load.

Figure 12:
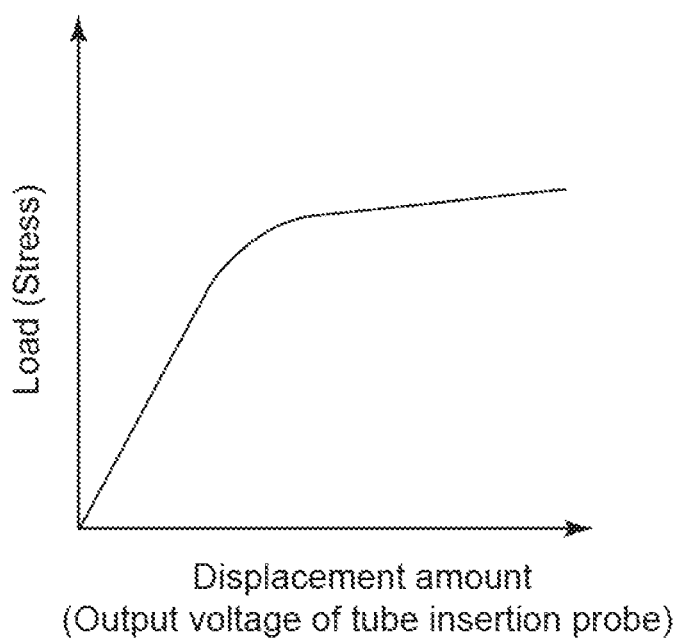
FIG. 12 is a graph showing a load-displacement curve (or stress-strain diagram).

At this time, the static strain meter 212 may acquire displacement detected by the displacement meter 210 as reference data and record the reference data in association with the characteristic data 120. In this case, the relationship between the output voltage of the tube insertion probe 102 and the load is represented by a graph similar to the load-displacement curve (or stress-strain diagram) as shown in FIG. 12. That is, when the load is in an elastic region, as the load is in proportion to the displacement, the load is in proportion to an output signal of the tube insertion probe 102. On the other hand, when the load increases into a plastic region, the increment of the displacement increases relative to the increment of the load. Similarly, the increment of the output signal of the tube insertion probe 102 increases relative to the increment of the load. By applying this conception, a cycle of adding and removing the load may be repeated while increasing the load, and the displacement and the output signal of the tube insertion probe 102 may be simultaneously measured, which makes it possible to measure the level of the output signal of the tube insertion probe 102 at which the heat-transfer tube 5 starts to plastically deform. Thereby, it is possible to keep the load within an elastic range, in terms of service life of the heat-transfer tube 5.

In this embodiment, in particular, two types of characteristic data 120 (first characteristic data 120a and second characteristic data 120b) are generated in accordance with a pattern of applying the load to the sample 122.

First, the first characteristic data 120a is generated by the load test shown in FIG. 7. In this load test, a pair of vibration damping members 14a, 14b is disposed on opposite sides so as to sandwich the heat-transfer tube 5 from both sides at a substantially same position in the axial direction of the sample 122. They are arranged so that the lower vibration damping member 14a is in contact with the test table 202 while the upper vibration damping member 14b is in contact with the load cell 204. Once the test table 202 is moved upward, load is applied to the sample 122 from both sides at the substantially same position along the axial direction. At this time, the sample 122 receives load from above and below so that the cross-sectional shape changes from circle to ellipse.

On the other hand, the second characteristic data 120b is generated by the load test shown in FIG. 8. In this load test, three vibration damping members 14a, 14b, 14c are disposed on opposite sides so as to sandwich the tube at different positions along the axial direction of the sample 122. They are arranged so that the two lower vibration damping member 14a, 14b are in contact with the test table 202 while the upper vibration damping member 14c is in contact with the load cell 204. In this case, the upper vibration damping member 14c is disposed on a substantially middle position between the two lower vibration damping member 14a, 14b along the axial direction. Thus, once the test table 202 is moved upward, upward load is applied to the sample 122 at positions in contact with the vibration damping members 14a, 14b, and downward load is applied to the sample 122 at a position in contact with the vibration damping member 14c. The sample 122 that receives such load is subjected to three-point bending deformation, as localized load is applied near corner portions of the vibration damping member 14c having a substantially rectangular cross-section.

As described above, FIGS. 7 and 8 differ in the form of load application to the sample 122. Since the output voltage obtained by the tube insertion probe 102 inserted into the sample 122 depends on these two types of load application form, the two types of characteristic data 120a, 120b are previously prepared in step S10.

Referring to FIG. 5 again, when the preparation of the characteristic data 120 using the sample 122 is completed, the tube insertion probe 102 is inserted into the heat-transfer tube 5 which is an actual subject to be measured, and measurement is started (step S11).

During measurement, the measurement tool body 108 (input unit 112) acquires a measurement value from the tube insertion probe 102 (step S12). The acquisition of the measurement value in step S12 is continuously performed while the tube insertion probe 102 is scanned within the heat-transfer tube 5 along the axial direction with the winding device 106. At this time, the measurement tool body 108 (input unit 112) acquires positional information of the tube insertion probe 102 together with the measurement value of the tube insertion probe 102 (step S13).

The positional information acquired in step S13 is, for instance, obtained based on winding amount or unwinding amount of the carrying cable 104 by the winding device 106. Then, the measurement tool body 108 associates and stores the measurement value acquired in step S12 and the positional information acquired in step S13 in the storage unit 114 (step S14).

Subsequently, the measurement tool body 108 determines whether the measurement value is acquired at a first point (a position at which the vibration damping members are disposed on opposite sides so as to sandwich the tube from both sides at a substantially same position in the axial direction) or a second point (a position at which the vibration damping member is disposed on one side at a substantially same position along the axial direction), based on the positional information associated with the measurement value acquired in step 14, and based on the specification data 124 previously stored in the storage unit 114 (step S15). The specification data 124 is data which defines the layout specification of the heat-transfer tube 5 and the vibration damping member 14 in the heat-transfer tube bundle 51 and defines structural information how to arrange the heat-transfer tube 5 and the vibration damping member 14 subjected to measurement.

An exemplary layout of the heat-transfer tube 5 and the vibration damping member 14 is shown in FIG. 2. Although details are omitted in FIG. 2, the first point and the second point are distributed in a predetermined pattern along the axial direction of each heat-transfer tube by the layout of the heat-transfer tube 5 and the vibration damping member 14 along the axial direction. Such a layout pattern is previously defined as the specification data 124 and is adopted to, when read by the measurement tool body 108, determine whether an individual position in the axial direction is the first point or the second point.

Then, the measurement tool body 108 (computing unit 116) calculates the contact force corresponding to the measurement value (output voltage value) acquired in step S12, based on the characteristic data 120 acquired from the storage unit 114 (step S16). As the characteristic data 120 used in this step, the first characteristic data 120a or the second characteristic data 120b is selected based on the determination that the positional information acquired in step S14 or step S13 is the first point or the second point. That is, the contact force corresponding to the measurement value measured at the first point is calculated based on the first characteristic data 120a, and the contact force corresponding to the measurement value measured at the second point is calculated based on the second characteristic data 120b. Since the characteristic data 120 defines a relationship between the output voltage and the contact force as shown in FIG. 6, the contact force corresponding to the measurement value is calculated.

The contact force thus calculated is output from the output unit 118 as a measurement result (step S17). The measurement result may be output as a distribution based on the positional information associated with the contact force, for instance.

Figure 9:
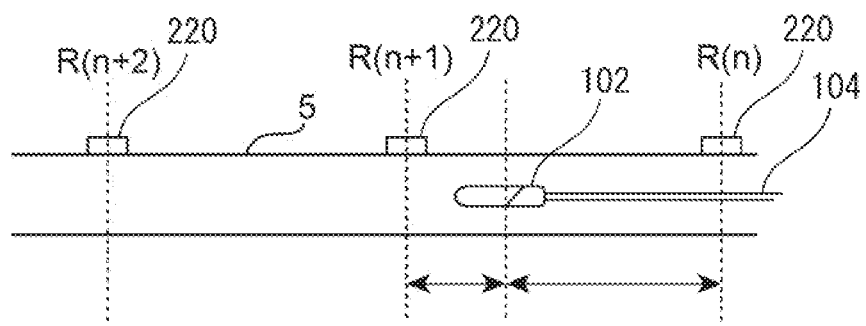
FIG. 9 is a schematic diagram showing markers disposed in reference positions along an axial direction of a heat-transfer tube.

While in the above-described embodiment, the positional information acquired in step S13 is obtained based on the winding amount or the unwinding amount of the carrying cable 104 by the winding device 106, the positional information may be acquired based on displacement with respect to a marker 220 disposed at a reference position (e.g., equispaced positions R(n), R(n+1), R(n+2) along the axial direction) along the axial direction of the heat-transfer tube 5 to be detected, as shown in FIG. 9, for instance. The marker 220 may be made of a material detectable by the tube insertion probe 102, for instance a metal material such as aluminum, and can be detected based on the output voltage of the tube insertion probe 102. The marker 220 may be formed in a tape shape attached to the outer surface of the heat-transfer tube 5 to be measured so as to be removable after completion of the measurement.

The position of the tube insertion probe 102 inserted into the tube can be adjusted based on the operation state (winding amount) of the winding device 106. In practice, however, roughness due to obstacle or scale can exist, or clogging can occur inside the heat-transfer tube 5, which causes some errors in the positional measurement. In case of FIG. 9, the markers 220 are disposed at reference positions along the axial direction and used as reference to control the position of the tube insertion probe 102 as displacement from the reference positions, thus suppressing errors.

Figure 10:
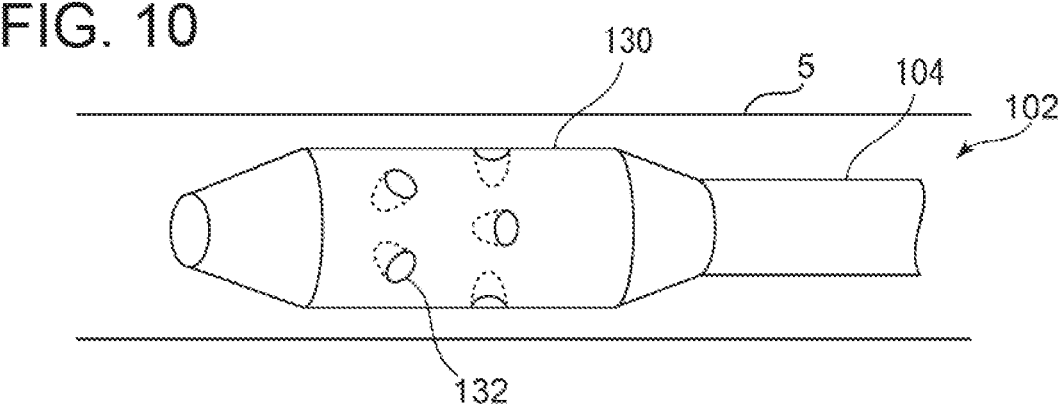
FIG. 10 is a diagram showing an example using an ultrasonic probe as a tube insertion probe.

Further, while in the above embodiment, the ECT probe is used as the tube insertion probe 102, the other type of probe may be used. FIG. 10 is a diagram showing an example using an ultrasonic probe as the tube insertion probe 102. This tube insertion probe 102 includes an ultrasonic probe accommodated in a holder 130 disposed on the distal end of the carrying cable 104. The ultrasonic probe has an electro-acoustic reversible transducer 132 and, for instance, has one or more oscillators including an electrostrictive element, a magnetostrictive element, or a composite of the electrostrictive and magnetostrictive elements.

The electro-acoustic reversible transducer 132 transmits ultrasonic waves to an inner wall of the heat-transfer tube 5, receives a received echo signal reflected from the tube wall, and then outputs the received echo signal in accordance with the intensity of the ultrasonic waves. The received echo signal output from the electro-acoustic reversible transducer 132 is sent to the measurement tool body 108 via the signal line not shown, and is used for calculating the contact force.

In the example of FIG. 10, multiple electro-acoustic reversible transducers 132 are disposed along the circumferential direction and the axial direction of the holder 130. Since the tube insertion probe 102 is moved within the heat-transfer tube 5 only by operation of the winding device 106, it is difficult to control the posture of the tube insertion probe 102. However, when the multiple electro-acoustic reversible transducers 132 are disposed along the circumferential direction and the axial direction of the holder 130, it is possible to measure the inner wall of the heat-transfer tube 5 over the circumference without rotating the tube insertion probe 102. This eliminates a rotary driving device and enables downsizing, compared with a case where ultrasonic inspection is performed with a single electro-acoustic reversible transducer 132 being rotated in the circumferential direction.

Figure 11:
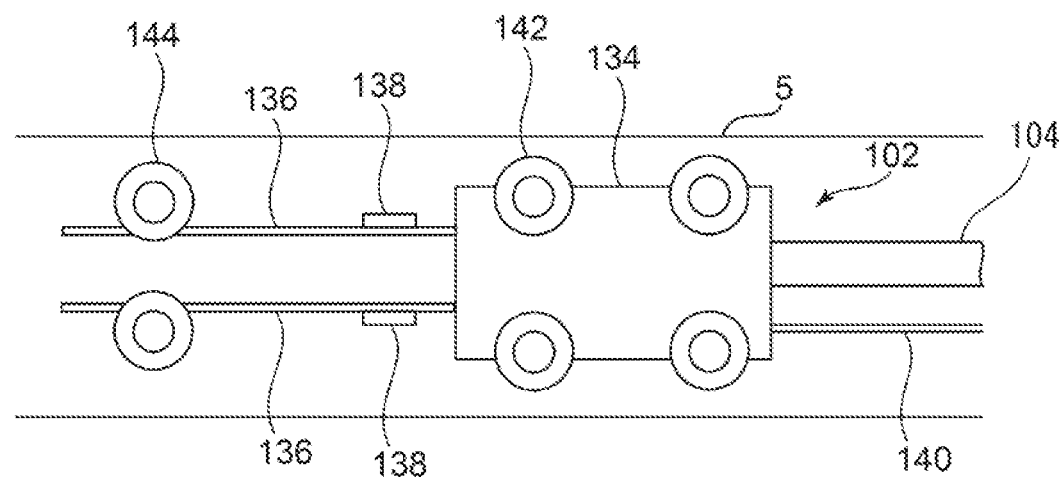
FIG. 11 is a diagram showing an example using an electrostatic capacitance displacement meter as a tube insertion probe.

FIG. 11 is a diagram showing an example using an electrostatic capacitance displacement meter as the tube insertion probe 102. This tube insertion probe 102 includes a body 134 connected to the carrying cable 104, a pair of leaf spring members 136 extending from the body 134 opposite to the carrying cable 104, a pair of measurement portions 138 respectively disposed on the pair of leaf spring members 136, and an output cable 140 for sending a measurement result of the pair of measurement portions 138 as an electrical signal. A side surface of the body 134 is provided with a plurality of wheels 142 facing the inner wall of the heat-transfer tube 5, and the tube insertion probe 102 is configured to be movable within the heat-transfer tube 5 along the axial direction by winding or unwinding the carrying cable 104 by the winding device 106.

Another wheel 144 is disposed near the distal end of each of the pair of leaf spring members 136 so as to face the inner wall of the heat-transfer tube 5. When the tube insertion probe 102 moves inside the heat-transfer tube 5, the wheel 144 is pressed along the (uneven) shape of the inner wall of the heat-transfer tube 5, and the leaf spring member 136 elastically deforms. As a result, the position of the measurement portion 138 disposed on the leaf spring member 136 is displaced.

The measurement portion 138 disposed on each of the pair of leaf spring members 136 is constituted as an electrode made of a conductive material such as metal. The pair of measurement portions 138 is disposed on the pair of leaf spring members 136 at a predetermined distance from each other to form electrostatic capacity. Since the electrostatic capacity is variable depending on the distance between the measurement portions, the electrostatic capacity changes as the measurement portions 138 change due to the shape of the inner wall of the heat-transfer tube 5. Accordingly, in this embodiment, when measurement current is applied between the pair of measurement portions 138 from the output cable 140, potential difference between the measurement portions 138 is detected, and the electrostatic capacity is determined based on the potential difference.

The electrostatic capacity thus determined is converted to the contact force based on characteristic data 120 which previously defines a relationship between the electrostatic capacity and the contact force modeled after FIG. 6. Such characteristic data 120 can also be generated, based on the same concept as in the load test shown in FIGS. 7 and 8, by previously measuring a relationship between the electrostatic capacity and the contact force.

While FIG. 11 shows an example of the tube insertion probe 102 using the electrostatic capacitance displacement meter, a strain gauge displacement meter may be used instead. In this case, a strain gauge is used for each measurement portion 138 disposed on each of the pair of leaf spring members 136. The strain gauge outputs an output signal corresponding to strain caused by deformation of the leaf spring member 136 due to the shape of the inner wall of the heat-transfer tube 5. Thus, when characteristic data 120 which previously defines a relationship between the output signal and the contact force is prepared, the contact force corresponding to the output signal can be determined. Such characteristic data can also be generated, based on the same concept as in the load test shown in FIGS. 7 and 8, by previously measuring a relationship between the output signal and the contact force.

As described above, according to the embodiments, it is possible to achieve the contact force measurement method whereby it is possible to appropriately measure a contact force applied to each heat-transfer tube 5 by the vibration damping member 14 supporting the heat-transfer tube bundle 51 disposed in a fluid.

INDUSTRIAL APPLICABILITY

This disclosure can be applied to a method for measuring a contact force applied to each tube from a vibration damping member inserted into a clearance between tubes in a tube bundle disposed in a fluid.

REFERENCE SIGNS LIST

1 Steam generator
2 Body section
4 Tube sheet

5 Heat-transfer tube
5a Arc portion
6 Tube support plate
14 Vibration damping member
51 Heat-transfer tube bundle
100 Contact force measurement system
102 Tube insertion probe
104 Carrying cable
106 Winding device
108 Measurement tool body
112 Input unit
114 Storage unit
116 Computing unit
118 Output unit
120 Characteristic data
122 Sample
124 Specification data
132 Electro-acoustic reversible transducer
134 Body
136 Leaf spring member
138 Measurement portion

The invention claimed is:

1. A contact force measurement method for measuring a contact force by a probe inserted into each tube, in a vibration damping structure in which a tube bundle disposed in a fluid is supported by a vibration damping member inserted between tubes included in the tube bundle, the contact force applied to the tube bundle from the vibration damping member, the method comprising:
a characteristic data preparation step of previously preparing characteristic data defining a relationship
between a value measured by the probe and the contact force;
a measurement value acquisition step of inserting the probe into the tube and acquiring a measurement value measured by the probe; and
a contact force calculation step of calculating the contact force corresponding to the measurement value, based on the characteristic data, and
wherein the characteristic data includes:
a first characteristic data corresponding to a first point at which the vibration damping member is disposed on opposite sides so as to surround the tube from both sides at a substantially same position along the axial direction, and
a second characteristic data corresponding to a second point at which the vibration damping member is disposed on one side at a position along the axial direction, and
wherein the contact force calculation step includes using the first characteristic data or the second characteristic data as the characteristic data, based on a positional relationship between the tube and the vibration damping member.

2. The contact force measurement method according to claim 1,
wherein the characteristic data preparation step includes performing a load test while applying a predetermined load corresponding to the contact force to a sample corresponding to the tube supported by the vibration damping member and acquiring a measurement value measured by the probe inserted into the sample to generate the characteristic data.

3. The contact force measurement method according to claim 2,
wherein the measurement value acquisition step includes acquiring positional information of the probe in conjunction with the measurement value while scanning the probe within the tube, and associating and storing the measurement value and the positional information.

4. The contact force measurement method according to claim 3,
wherein the measurement value acquisition step includes providing a marker detectable by the probe at a reference position along an axial direction of the tube, and acquiring the positional information based on displacement from the reference position when the measurement value is acquired.

5. The contact force measurement method according to claim 2,
wherein the characteristic data preparation step includes:
generating first characteristic data based on the measurement value acquired by applying the predetermined load on opposite sides so as to sandwich the tube from both sides at a substantially same position along an axial direction of the sample, and
generating second characteristic data based on the measurement value acquired by applying the predetermined load on opposite sides along a direction crossing to the axial direction so as to sandwich the tube at different positions along the axial direction of the sample.

6. The contact force measurement method according to claim 5, wherein the tube includes
the first point, and
the second point, and
wherein the contact calculation step includes
calculating the contact force corresponding to the measurement value measured at the first point, based on the first characteristic data, and
calculating the contact force corresponding to the measurement value measured at the second point, based on the second characteristic data.

7. The contact force measurement method according to claim 1,
wherein the probe is an eddy current testing probe insertable into the tube.

8. The contact force measurement method according to claim 1,
wherein the probe includes a displacement meter capable of measuring an inner diameter of the tube by being inserted into the tube.

9. The contact force measurement method according to claim 1,
wherein the measurement value acquisition step includes acquiring positional information of the probe in conjunction with the measurement value while scanning the probe within the tube, and associating and storing the measurement value and the positional information.

* * * * *